(12) United States Patent
Elbury et al.

(10) Patent No.: US 8,219,814 B2
(45) Date of Patent: Jul. 10, 2012

(54) SYSTEM AND METHOD OF USER CREDENTIAL MANAGEMENT

(75) Inventors: Ian Elbury, New Westminster (CA); Rastislav Hodul, Port Moody (CA)

(73) Assignee: Psion Teklogix Inc., Mississauga, OT (CA)

( * ) Notice: Subject to any disclaimer, the term of this patent is extended or adjusted under 35 U.S.C. 154(b) by 1428 days.

(21) Appl. No.: 11/172,457

(22) Filed: Jun. 30, 2005

(65) Prior Publication Data

US 2007/0006299 A1    Jan. 4, 2007

(51) Int. Cl.
*H04L 9/32* (2006.01)
(52) U.S. Cl. ........ 713/170; 713/159; 380/283; 380/270; 726/19; 726/20
(58) Field of Classification Search .......... 380/283, 380/270; 713/155, 159, 170, 183; 726/6, 726/19, 20
See application file for complete search history.

(56) References Cited

U.S. PATENT DOCUMENTS

| | | | |
|---|---|---|---|
| 5,778,071 A * | 7/1998 | Caputo et al. | 713/159 |
| 6,694,434 B1 | 2/2004 | McGee et al. | 713/189 |
| 6,934,848 B1 * | 8/2005 | King et al. | 713/182 |
| 7,685,631 B1 * | 3/2010 | Paya et al. | 726/8 |
| 2005/0166263 A1 * | 7/2005 | Nanopoulos et al. | 726/7 |
| 2006/0136717 A1 * | 6/2006 | Buer et al. | 713/155 |

OTHER PUBLICATIONS

Search Results from http://www.google.ca/search?q=application+provisioning+system&ie=UTF-8&oe-UTF-8&ht=en&meta=.

* cited by examiner

*Primary Examiner* — Eleni Shiferaw
*Assistant Examiner* — Paul Callahan
(74) *Attorney, Agent, or Firm* — Ziegler IP Law Group, LLC

(57) ABSTRACT

A user credential management system and method for managing user credentials are provided. The user credential management system comprises an authentication module for authenticating a user login to a mobile device, and a message transforming module for associating a user credential to a message sent from the mobile device to a server. The method comprising the steps of authenticating a user login to a mobile device, locating a user credential associated with the user login, and associating the user credential to a message between the mobile device and a server.

20 Claims, 3 Drawing Sheets

_US 8,219,814 B2_

SYSTEM AND METHOD OF USER CREDENTIAL MANAGEMENT

FIELD OF INVENTION

The present invention relates generally to distributed mobile applications, and in particular, to a system and method of user credential management.

BACKGROUND OF THE INVENTION

Mobile devices may be used by multiple users. For example, an enterprise may provide each worker with a mobile device to work with and report to a central server. Alternatively, a plurality of devices may be provided to a plurality of locations to be used by a plurality of users. When data is collected and posted to a server, it is desirable to know who the user is.

On CE devices there is NTLM authentication against an IIS server available if the device is online. There are other single sign on technologies (such as Kerberos) but these require all participating systems to accept the same type of credential. There is a need for offline authentication for mobile devices.

SUMMARY OF THE INVENTION

The present invention relates to distributed mobile applications where data collection can take place in environments with and without radio (or other telecommunication) coverage. It is an object of the invention to provide a system and method of user credential management.

In accordance with an embodiment of the invention, there is provided a user credential management system for managing user credentials. The user credential management system comprises an authentication module for authenticating a user login to a mobile device, and a message transforming module for associating a user credential to a message sent from the mobile device to a server.

In accordance with another embodiment of the invention, there is provided a method of managing user credentials. The method comprising the steps of authenticating a user login to a mobile device, locating a user credential associated with the user login, and associating the user credential to a message between the mobile device and a server.

Advantageously, the system and method of user credential management allows for centrally managed user and credential management. The login to multiple backend systems is transparent to the user (only needs one user name and password—single sign on).

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

The following description is of a preferred embodiment.

The present invention will be further illustrated in the following examples.

Figure 1:
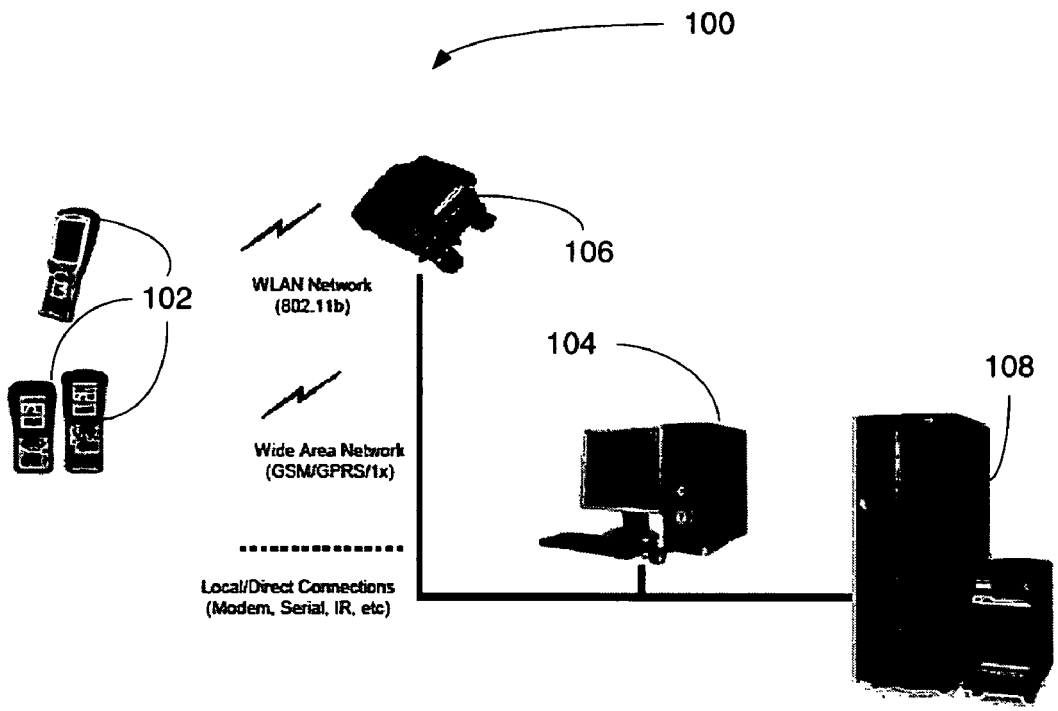
FIG. 1 shows in a network diagram an example of a system overview of a design, development and operational environment, in accordance with an embodiment of the invention.

FIG. 1 shows in a network diagram an example of a system overview 100 of a design, development and operational environment for deploying feature rich applications (that use web services) to mobile devices and desktop personal computers, in accordance with an embodiment of the invention. The system overview 100 comprises one or more or mobile client components (or handheld terminals) 102 for allowing a user to collect, review and modify data; a server component 104 for providing applications and connectivity options to external systems; a network 106 for allowing the handheld terminals 102 to communicate with the server component 104 via a communications protocol; and a back-end system (or host) 108 for providing a database or enterprise resource planning (ERP) system. Examples of mobile components include personal computers (PCs), vehicle mount computers, tablet PCs, and devices with embedded operating systems, etc.

Figure 2:
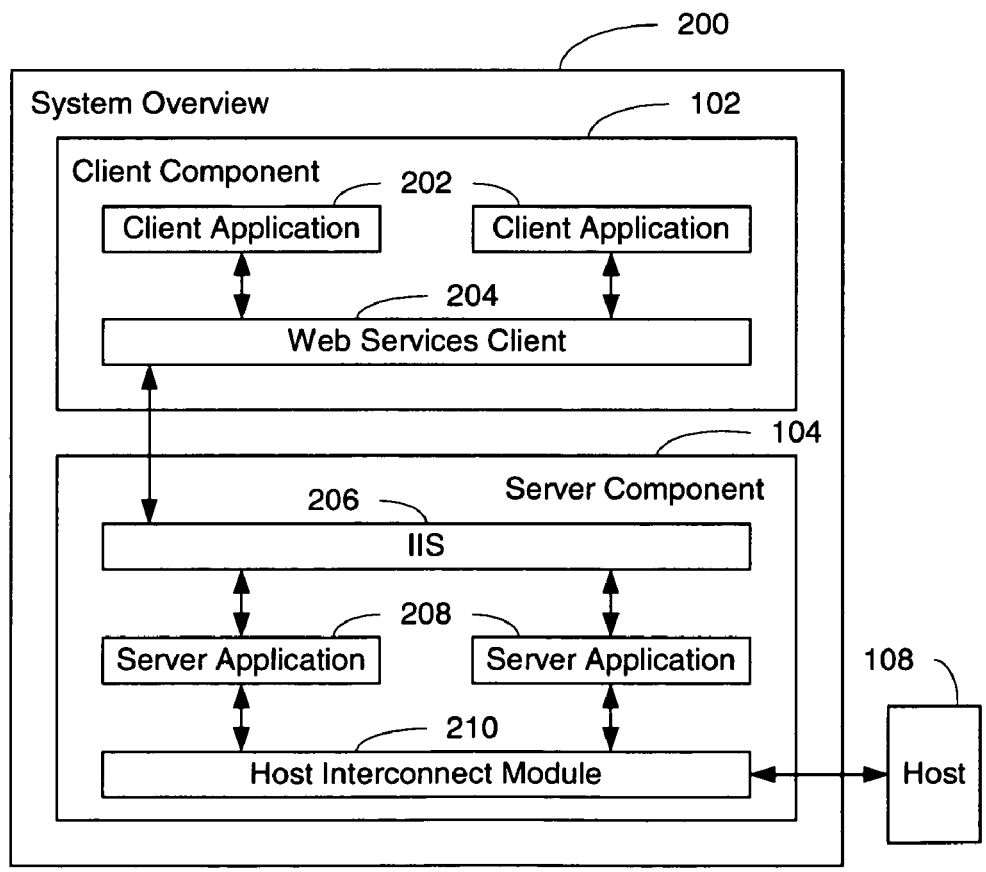
FIG. 2 shows in a layer diagram another example of a system overview of a design, development and operational environment, in accordance with an embodiment of the invention.

FIG. 2 shows in a layer diagram another example of a system overview 200 of a design, development and operational environment, in accordance with an embodiment of the invention. The mobile client component 102 comprises one or more client applications 202 that communicate with a web services client 204. The server component 104 comprises an Internet information server (IIS) 206 for communicating with the web services client 204, one or more server applications 208 and a host interconnect module 210 for communicating with the host (or back-end system) 108. The server applications 208 communicate with both the IIS 206 and the host interconnect module 210.

An application console may be installed as client application 202 on the mobile client component 102 to provide a presentation layer and application framework that end users use to collect, review and modify data. The application console communicates with the server component 104 via web services running on the IIS 206. The server component 104 is a middle tier where data is synchronized before being sent to the back-end system 108.

The server component 104 provides the applications and connectivity options to integrate back-end systems 108. A unified administration console for administering middleware on may be installed as a server application 206 to provide a single source for system management and monitoring and can be used remotely. Advantageously, the unified administrative console simplifies multi-site, multi-device management and deployment. This allows for ease of deployment and controlled rollouts. Host interconnect modules 210 provide the information and logic used to integrate with the back-end systems 108.

Back-end systems 108, whether databases or full-featured ERP systems, are supported via the host interconnect modules 210 installed on the server component 104. Standard interface technologies are supported, including extensible markup language (XML) and open database connectivity (ODBC), as well as ERP-specific interfaces.

Figure 3:
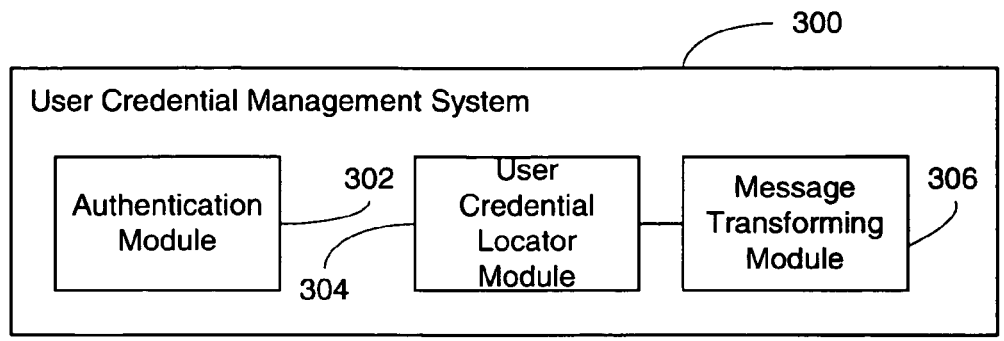
FIG. 3 shows an example of a user credential management system for managing user credentials, in accordance with an embodiment of the invention.

FIG. 3 shows an example of a user credential management system 300 for managing user credentials, in accordance with an embodiment of the invention. The user credential management system 300 comprises an authentication module 302 for authenticating a user login to a mobile device 102, a user credential locator module 304 for determining the user credential associated with the user login, and a message transforming module 306 for associating user credentials to a user message sent from the mobile device to a server. Other components may be added to the user credential management system 300, such as a credential sender implemented on a server for sending user credentials to a mobile device, a credential receiver module implemented on a mobile device for receiving credentials from a server, and a user credential repository for storing user credentials.

The user credential management system 300 can be implemented in the application console. Preferably, a user credential is encrypted and comprises a random string appended to a user password. Preferably, a user credential repository is implemented on a server with a plurality of user credentials. The plurality of user credentials may be divided into groups. A user credential repository may also be implemented on a mobile device, preferably for one or a group of credentials. Advantageously, dividing the user credentials into groups allows for less information to download to a mobile device, makes the user credentials easier to manage, and allows an administrator to manage a site locally.

Figure 4:
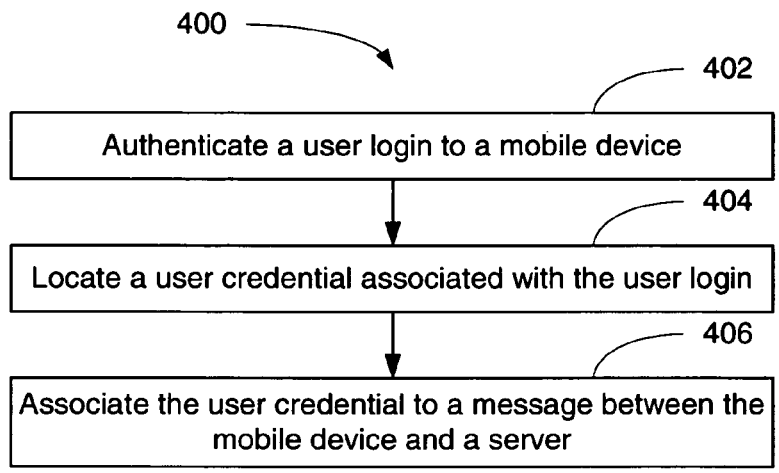
FIG. 4 shows in a flowchart an example of a method of managing user credentials, in accordance with an embodiment of the user credential management system.

FIG. 4 shows in a flowchart an example of a method of managing user credentials (400), in accordance with an embodiment of the user credential management system 300. The method (400) comprises the steps of authenticating a user login to a mobile device (402), determining a user credential associated with the user login (404), and associating user credentials to a communication message between the mobile device and a server (406). Preferably, the user credential may be determined by mapping an authentic user login to a user credential. Alternatively, the user login may generate the appropriate user credential. A message may be associated with a user credential by automatically attaching the user credential to the message during communication. Other steps may be added to the method (400), such as sending user credentials to a mobile device, receiving credentials from a server, and creating and storing user credentials.

Figure 5:
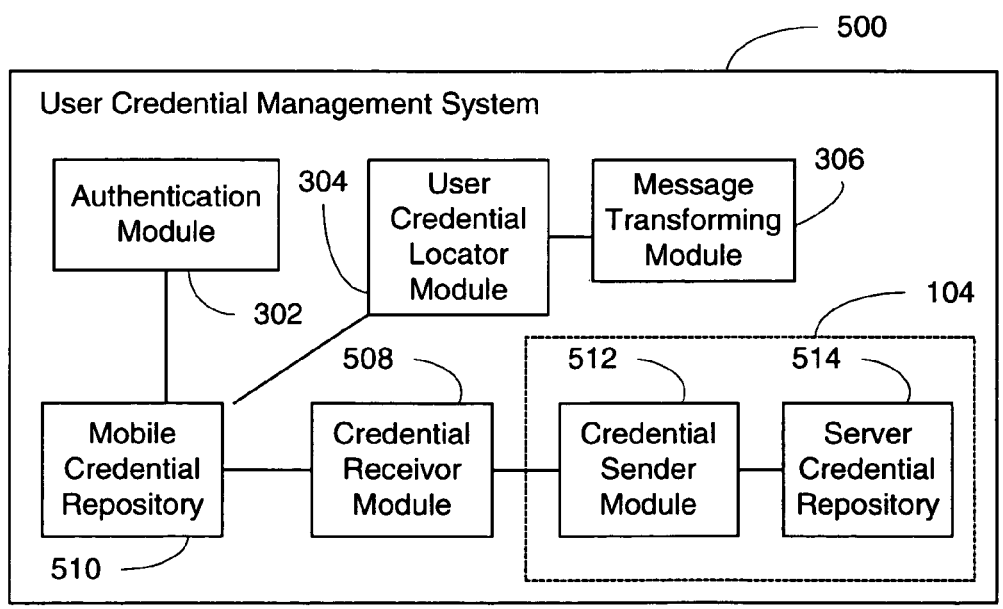
FIG. 5 shows another example of a user credential management system.

FIG. 5 shows another example of a user credential management system 500. The user credential management system 500 comprises the authentication module 302, the user credential locator module 304, the message transforming module 306, a credential receiver module 508 for receiving credentials from a server, and a mobile credential repository 510 for storing one or a group of user credentials on the mobile device. These components 302, 304, 306, 508, and 510 are preferably implemented as code in a mobile device. The user credential management system 500 further comprises components implemented as code on a server, including a credential sender module 512 for sending user credentials to a mobile device, and a user credential repository 514 for storing a plurality of user credentials. Other components may be added to the user credential management system 500, including an application provisioning system for administering and delivering software applications or components to client devices 102.

A user database (or the user credential repository 514) is centrally managed on the server. Preferably, this database is encrypted and assigned to the workstations using application provisioning and downloaded the workstation as any other component assigned to it. Alternatively, the workstations can download the database file from the server in other means, such file transfer protocol (ftp), web services, etc. Once the database is present on the workstation, the client runtime environment, or application console, prompts the user to login. After successful login, the user's identity is attached to every single web service request the application makes using web services enhancements (WSE).

Each user can have one or many extended credentials attached to them on the server that are not downloaded to the workstation. When the client application calls the web service that is supposed to send the data to ERP (e.g., SAP) for which further credentials are required, the service can search the credentials of the calling user and use them to login to ERP system.

Figure 6:
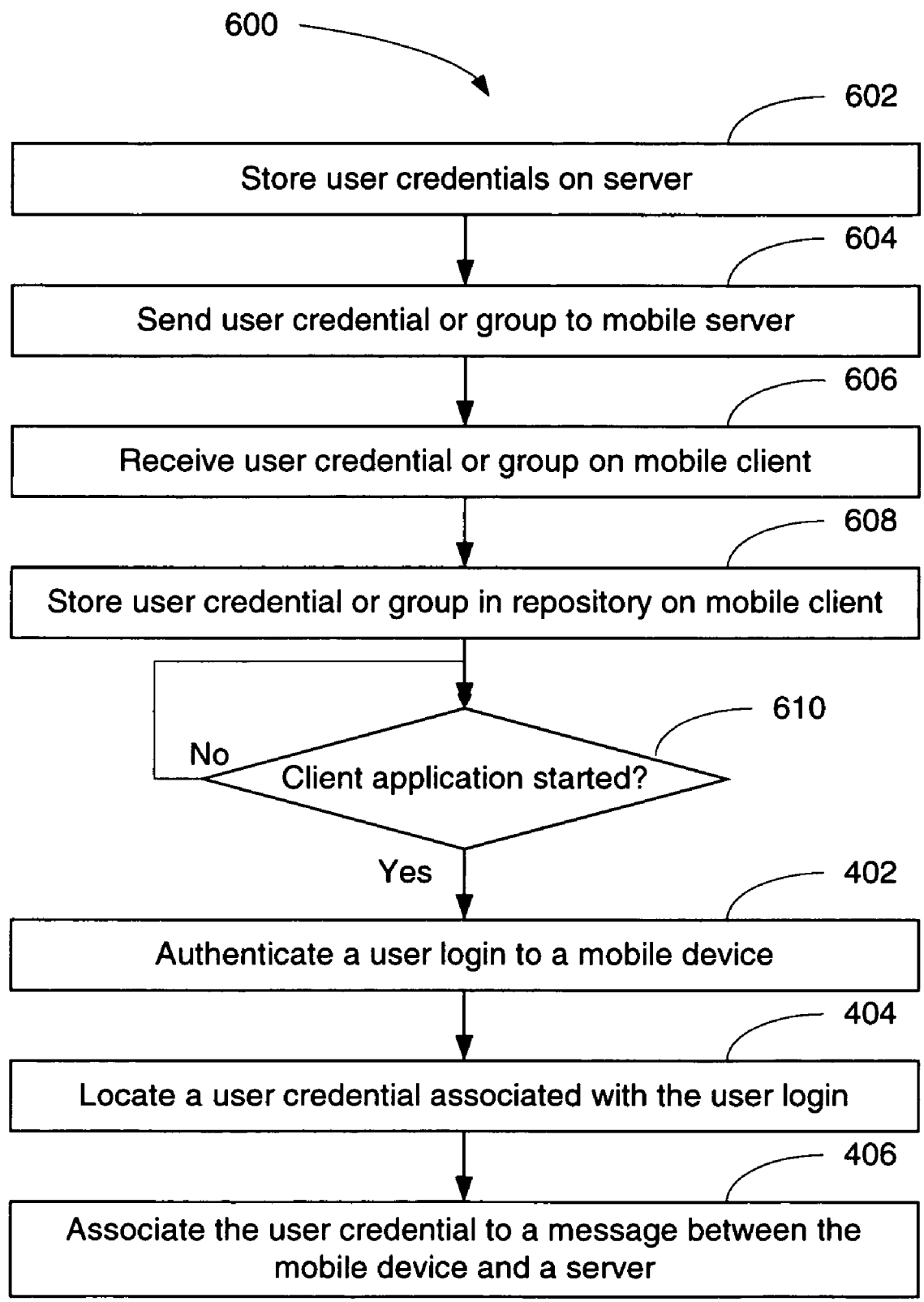
FIG. 6 shows in a flowchart another example of a method of managing user credentials, in accordance with an embodiment of the user credential management system.

FIG. 6 shows in a flowchart another example of a method of managing user credentials (600), in accordance with an embodiment of the user credential management system 500. The method (600) comprises the step of storing user credentials in a repository on a server (602). The user credentials (for example, a user name and password) may be stored in one database table. Credentials to foreign systems (e.g., ERP) may be stored in another database table. A user credential or group of user credentials may be sent to a mobile device (604). The mobile device receives the user credential or group (606) and stores same in a local mobile credential repository (608). When an application is started (610), a user login is authenticated (402). A user credential associated with the user login is located (404). A communication sent by the user between the mobile device and the server is associated with the user credential (406) as found in the mobile credential database and server user credential database. Preferably, when the message from the client arrives, the credential attached to it is re-authenticated on the server again, to make sure that someone along the way did not inject a bogus credential. Thus, the username and hashed password attached to the message is again authenticated on the server, as a precaution. Other steps may be added to the method (600), including storing a plurality of user credentials for a single user, the plurality of user credentials associated with a plurality of foreign servers, and associating messages between the mobile device and foreign servers with the appropriate user credential.

Typically, operating systems for mobile devices do not offer an authentication mechanism in a disconnected environment. Users of the user credential management system 300, 500 and method 400, 600 can authenticate the user on a workstation even if the user is not contacting the server. The single sign on brings transparency to the user when the user's data is further posted to ERP system. The user does not need to know or be aware of the user credentials to the ERP system.

Advantageously, the system 300, 500 and method 400, 600 of user credential management allows for centrally managed user and credential management. The login to multiple back-end systems is transparent to the user (only needs one user name and password—single sign on).

The user credential management system and method according to the present invention may be implemented by any hardware, software or a combination of hardware and software having the above described functions. The software code, either in its entirety or a part thereof, may be stored in a computer readable memory. Further, a computer data signal representing the software code which may be embedded in a carrier wave may be transmitted via a communication network. Such a computer readable memory and a computer data signal are also within the scope of the present invention, as well as the hardware, software and the combination thereof.

While particular embodiments of the present invention have been shown and described, changes and modifications may be made to such embodiments without departing from the true scope of the invention.

What is claimed is:

1. A user credential management system in a mobile device, comprising:
a computer readable storage medium in the mobile device, for storing instructions or statements for use in the execution in a computer of a method of managing user credentials, the method comprising
receiving, by a receiver of the mobile device, at least one user credential sent by an authentication server;
storing, in a repository of the mobile device, the at least one user credential received by the receiver;
authenticating, on the mobile device, the user login based on the at least one user credential stored in the repository of the mobile device thereby enabling authentication of the user login even when a connection to the authentication server is not available;
determining, on the mobile device, a user credential associated with the user login; and
associating the user credential associated with the user login to a message sent from the mobile device to the authentication server after authentication of the user login, and
wherein the at least one user credential is stored in a repository of the authentication server, and
wherein the step of associating the user credential associated with the user login to the message sent from the mobile device to the authentication server comprises associating the message between a foreign server and the mobile device with the at least one user credential.

2. The user credential management system as claimed in claim 1, wherein the at least one user credential sent from the authentication server to the mobile device is encrypted and includes a username and a string of characters.

3. The user credential management system as claimed in claim 1, wherein the repository of the mobile device includes a mapping between the at least one user credential and a username.

4. The user credential management system as claimed in claim 1, wherein the at least one user credential in the repository of the authentication server is grouped.

5. The user credential management system according to claim 1, wherein the repository of the authentication server stores at least one extended credential for user login to at least one foreign system, and the at least one extended credential is further associated with the message sent by the mobile device.

6. The user credential management system according to claim 1, wherein the message sent by the mobile device is re-authenticated by the authentication server.

7. The user credential management system according to claim 1, wherein determining the user credential associated with the user login comprises determining the user credential associated with the user login by locating, in the repository of the mobile device, the user credential associated with the user login.

8. The user credential management system according to claim 1, wherein determining the user credential associated with the user login comprises generating the user credential associated with the user login based on the user login.

9. A method of managing user credentials in a mobile device, the method comprising:
authenticating a user login to a mobile device based on at least one user credential stored in the mobile device, the at least one user credential stored in the mobile device enabling authentication of the user login when a connection to an authentication server is lost;
determining, on the mobile device, a user credential associated with the user login; and
associating the user credential associated with the user login to a message sent from the mobile device after authentication of the user login, and
storing, in a repository of the authentication server, at least one extended credential for user login to at least one foreign system; and
further associating the message sent by the mobile device with the at least one extended credential belonging to the authenticated user login of the mobile device, and
wherein the at least one extended credential allows the authenticated user login of the mobile device to login to the at least one foreign system.

10. The method as claimed in claim 9, wherein the at least one user credential is stored in a repository on the authentication server and sent to the mobile device.

11. The method as claimed in claim 10, wherein the at least one user credential in the repository of the authentication server is grouped.

12. The method as claimed in claim 9, wherein a group of user credentials is sent from the authentication server to the mobile device.

13. The method as claimed in claim 12, further comprising:
receiving, on a receiver of the mobile device, the group of user credentials from the authentication server.

14. The method as claimed in claim 9, further comprising:
receiving, on a receiver of the mobile device, the at least one user credential from the authentication server.

15. The method as claimed in claim 9, comprising:
storing the at least one user credential in a local credential repository of the mobile device.

16. The method according to claim 15, wherein determining the user credential associated with the user login comprises locating, in the repository of the mobile device, the user credential associated with the user login.

17. The method according to claim 15, wherein determining the user credential associated with the user login comprises generating the user credential based on the user login.

18. The method according to claim 9, wherein
the user credential associated with the user login with the message sent from the mobile device is re-authenticated.

19. The method according to claim 9, wherein the at least one user credential is encrypted.

20. The method according to claim 9, wherein the at least one user credential contains random string appended to a user password.

* * * * *

UNITED STATES PATENT AND TRADEMARK OFFICE
CERTIFICATE OF CORRECTION

PATENT NO. : 8,219,814 B2  
APPLICATION NO. : 11/172457  
DATED : July 10, 2012  
INVENTOR(S) : Elbury et al.

Page 1 of 1

It is certified that error appears in the above-identified patent and that said Letters Patent is hereby corrected as shown below:

In the Drawings

In Fig. 5, Sheet 2 of 3, for Tag "508", in Line 2, delete "Receivor" and insert -- Receiver --, therefor.

In the Specifications

In Column 1, Line 6, delete "distributed" and insert -- distribute --, therefor.

In Column 2, Line 37, delete "information server" and insert -- Information Server --, therefor.

In Column 4, Line 1, delete "(ftp)," and insert -- (FTP), --, therefor.

In Column 4, Line 6, delete "(WSE)." and insert -- (WSEs). --, therefor.

In the Claims

In Column 5, Line 9, in Claim 1, delete "comprising" and insert -- comprising: --, therefor.

Signed and Sealed this  
Twenty-third Day of April, 2013

Teresa Stanek Rea  
*Acting Director of the United States Patent and Trademark Office*